Figure 4:
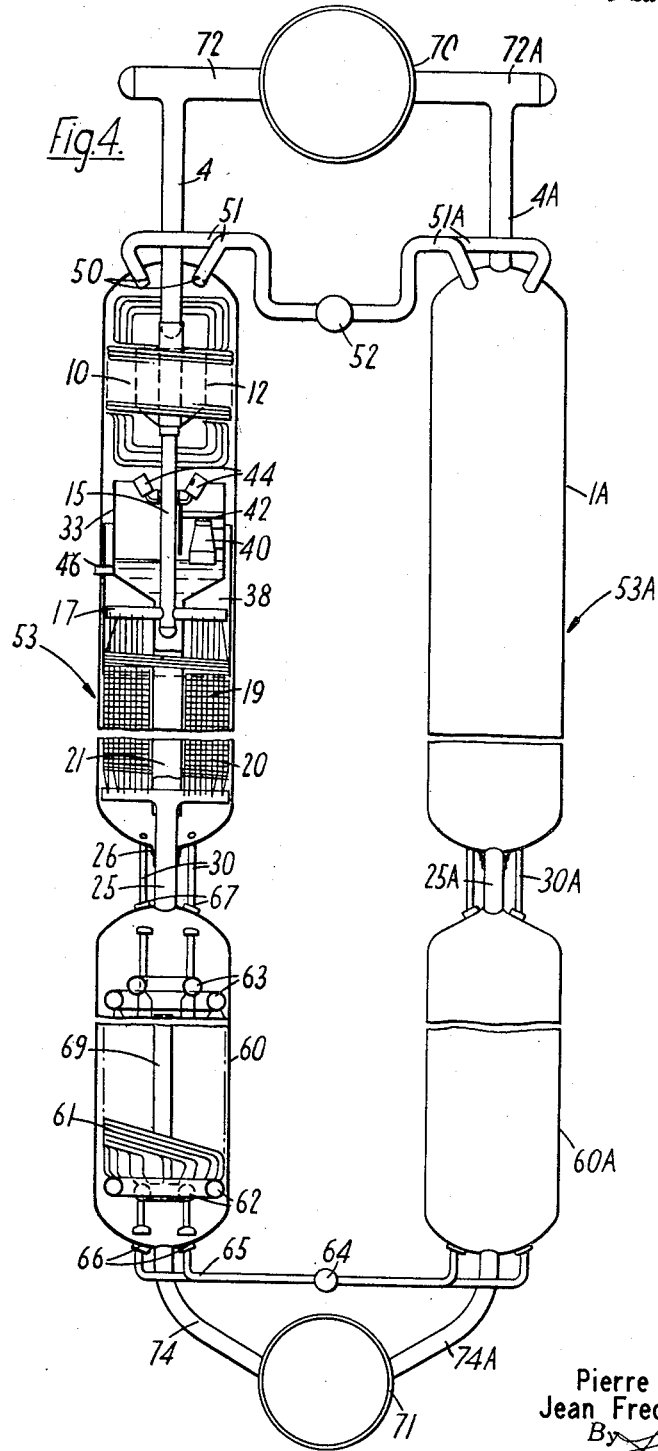

Jan. 5, 1965     P. H. PACAULT ETAL     3,164,133
HEAT RECOVERY UNITS
Filed Feb. 9, 1961     3 Sheets-Sheet 1
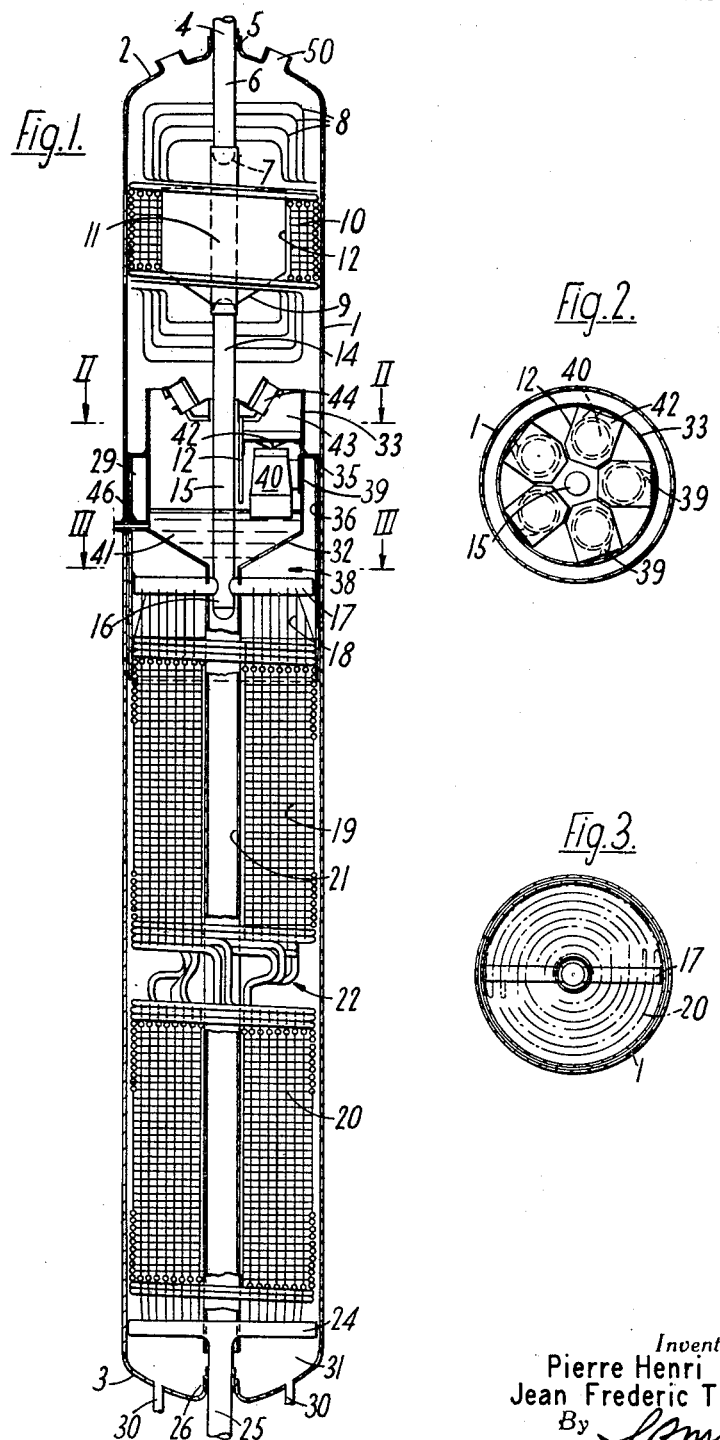
Inventors
Pierre Henri Pacault
Jean Frederic Tillequin
By *J. P. Moran*
Attorney Jan. 5, 1965  P. H. PACAULT ETAL  3,164,133
HEAT RECOVERY UNITS
Filed Feb. 9, 1961  3 Sheets-Sheet 2

Inventors
Pierre Henri Pacault
Jean Frederic Tillequin
By
Attorney

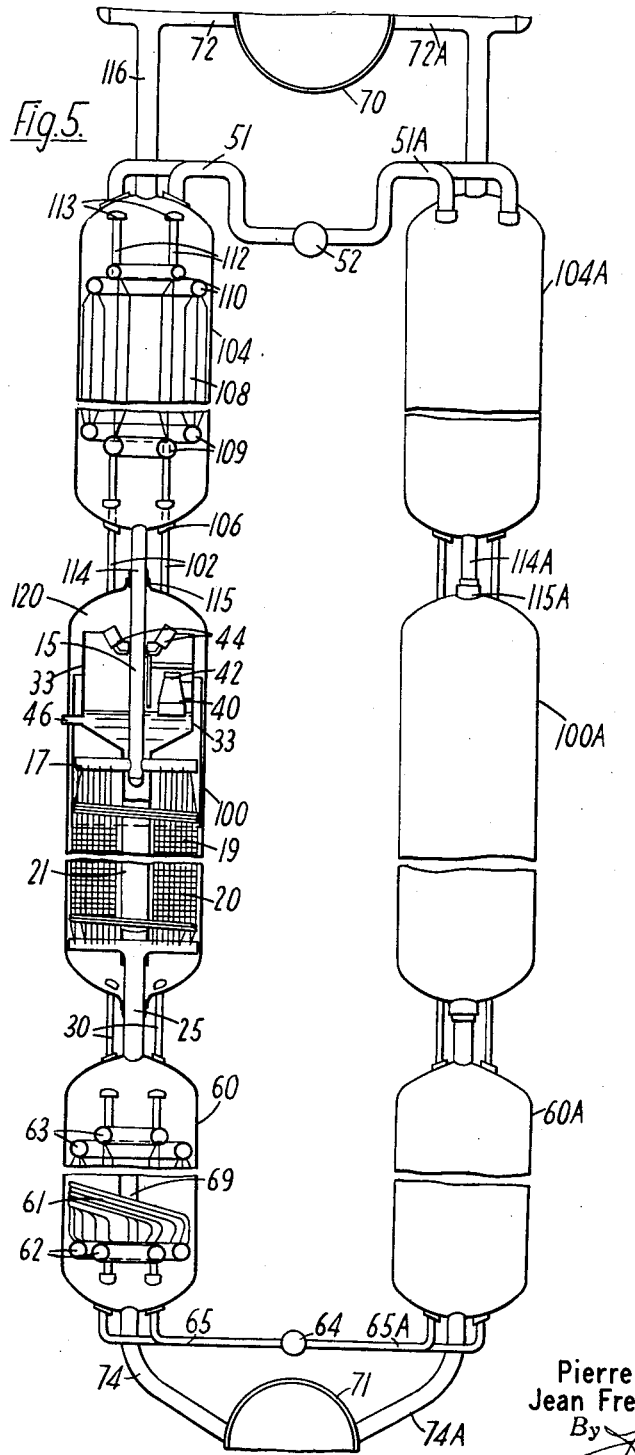

United States Patent Office 3,164,133
Patented Jan. 5, 1965

3,164,133
HEAT RECOVERY UNITS
Pierre Henri Pacault and Jean Frederic Tillequin, Paris, France, assignors to Babcock & Wilcox, Limited, London, England, a company of Great Britain
Filed Feb. 9, 1961, Ser. No. 88,205
Claims priority, application France, Feb. 20, 1960, 819,105
11 Claims. (Cl. 122—34)

The present invention relates in general to units for recovering the heat of a fluid under pressure, and in particular to the recovery of heat from a gas under pressure used, for example, for cooling a nuclear reactor.

In plants of this nature hitherto known, the hot fluid generally circulates under pressure in one or two enclosures arranged in parallel, the liquid to be evaporated and the vapor produced circulating in tubes situated within this enclosure or enclosures.

This arrangement is of advantage when the pressure of the heating fluid is considerably below that of the fluid to be vaporized. There are however applications in which the opposite case may occur, of a hot fluid available at pressures of the same order of magnitude, or even higher than those of the fluid to be vaporized, and the present invention has as its object an adaptation, with a view to applications of this nature, of an arrangement that is the reverse of previous arrangements, in that, at least partially, recovery of the heat of the hot fluid is effected by circulating the heating fluid within a nest of tubes which is swept on its exterior by the fluid to be vaporized, this arrangement being capable of exhibiting important advantages, especially due to the reduction of the maximum temperature to which the enclosure enveloping the exchanger or exchangers will be exposed.

A heat recovery unit according to the invention comprises at least one exchanger tower equipped with a nest of exchanger tubes with balanced resistances and arranged in parallel between an intake distributor and an outflow collector; the hot fluid passes to the interior of the tubes of this bundle, while the liquid to be vaporized is admitted into a liquid intake chamber formed at the bottom of the tower, evaporated on the outside of the aforesaid bundle and the liquid-vapor emulsion is collected above the said bundle in an equal-pressure internal enclosure equipped with means for liquid-vapor separation and comprising at least one descent outlet for the separated liquid and an outflow passage for the vapor in the upper part of the tower.

The boiler element thus formed may be advantageously associated with economizer and/or superheater elements, and be grouped in batteries of identical elements so as to form heat recovery plants of varying size for the most diverse applications, the hot fluid being not only gases under pressure, but also a vapor which is desuperheated and/or condensed, or a liquid which is cooled.

Accordingly the present invention provides a vapor generating and superheating unit comprising a vertically elongated circular pressure vessel adapted to contain a body of vaporizable liquid having a liquid level separating an upper vapor space from a lower liquid space. A plate means is disposed within the pressure vessel and coacts with the pressure vessel wall to form an annular vapor-liquid collection chamber above the liquid space. This plate means has a lower portion of reduced diameter which forms a tubular downcomer extending coaxially with the pressure vessel to the lower portion of the liquid space and also forms an annular vapor generating chamber between the downcomer and the pressure vessel wall which communicates at its upper end with the vapor-liquid collection chamber. A plurality of tubes constitute an annular bundle arranged to fill the vapor generating chamber. Vapor-liquid separating means are arranged to separate a vapor-liquid mixture received from the vapor-liquid collection chamber and to discharge the separated liquid to the downcomer and the separated vapor to the vapor space wherein means is disposed to superheat the separated vapor. Means is also provided for passing a heating fluid through the tubes to vaporize and superheat the vaporizable liquid.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described preferred embodiments of the invention.

Of the drawings:
FIGURE 1 is a schematic elevation, along a section in a plane through the diameter, of an evaporation tower according to the invention;
FIGURES 2 and 3 are detailed views along sections through lines 2—2 and 3—3, respectively, of FIGURE 1;
FIGURE 4 is a schematic elevation of a plant for recuperation of the heat of a fluid;
FIGURE 5 is a similar view relating to a variant embodiment.

In the embodiment chosen in FIGURES 1 to 3, a member of an evaporation designed to recover the heat contained in a hot fluid under pressure consists of a tower or pressure vessel 1, of cylindrical cross section, elongated in the vertical direction and closed at its extremities by domed ends 2 and 3; the hot fluid, for example a gas under pressure coming from a nuclear reactor, is admitted into the upper end of the tower through a pipe 4 via a sleeve 5, the prolongation of this intake pipe forming an axial inlet header or distributor 6 closed at 7. This distributor feeds, in parallel, a plurality of tubes 8 which are coiled in a helicoidal bundle 10 in an annular space formed between a baffle plate 12 and the pressure vessel wall 1. The helicoidal bundle 10 may have one or more coils to increase the gas passage cross section, arrangements being made to balance the flow resistances of these coils. The gas leaving bundle 10 is collected in an axial collector 14 formed at one end of a tubular conduit 15, at the lower end 16 of which an upper header or diametral distributor 17 is attached. A plurality of tubes 18 leaving this distributor forms a helicoidal bundle in two parts 19-20 coiled around an axial downcomer 21 in the annular space formed between said downcomer and the cylindrical outer wall. The spirals may have one or more coils to increase the gas passage cross section and reduce the pressure loss through the exchanger. A zone 22 in which the spirals cross is formed between the two halves 19-20 of the bundle in order to balance the resistances, and hence the outflow of gas, and make it possible for the gas to cool equally in each spiral. The spirals lead to a single outflow collector or lower header 24, from which a gas outflow duct 25 leaves, which duct passes through the bottom 3 of the tower via a thermal sleeve 26.

Some of the liquid to be evaporated, for example water, is introduced at the bottom of the pressure vessel, by one or more intake pipes 30, into a liquid intake chamber 31 formed at the bottom of the pressure vessel.

At the top of downcomer 21 there is attached, by means of a funnel 32 in the shape of a truncated cone, a cylindrical pressure-equalizing enclosure 33 forming a peripheral annular space with the adjacent portion of the tower. An annular transverse barrier 35 welded to the outer surface of enclosure 33 and having a skirt 36 going down, with a little play, along the inner wall of the tower down to the inlet of bundle 19, bounds a vapor-liquid collection chamber 38 for the entry of the liquid-vapor emulsion, around the lower portion of enclosure 33. Facing the upper portion of this vapor-liquid collection chamber 38 the wall of enclosure 33 is pierced by a certain number, five in the example shown, of orifices 39, forming the intakes of a battery of cyclone vapor-liquid separators 40, the bottoms of which dip in the usual manner in a separate liquid space 41 formed in enclosure 33, while the separated steam escapes from each cyclone 40 via a primary baffle-plate dryer 42 into a vapor or steam chamber 43 formed in the upper part of enclosure 33; equally usual secondary dryers 44 of the labyrinth type constitute the passages through which the dry steam comes out into the upper portion of the tower.

In the boiler member thus formed, the liquid evaporates in the annular space formed between downcomer 21 and the corresponding part of the outer wall, in contact with helicoidal bundle 19-20. The emulsion collected in chamber 38 escape via orifices 39 into separator cyclones 40. The steam escaping from the cyclones is dried in primary dryers 42 and then in secondary dryers 44, undergoes superheating in passing along the outside of the tubes making up superheating bundle 10 and escapes to a point at which it is used via one or more steam outlet pipes 50 installed to that end in the upper end 2 of the tower. The water, freed of its vapor, is diverted by cyclones 40 into liquid space 41 of pressure-equalizing enclosure 33 and recycled by downcomer 21 into the lower portion of the pressure vessel, liquid chamber 31, where it merges with the liquid admitted through intake pipe or pipes 30, coming from an economizer, for example.

A water tap 46 may be installed in liquid chamber 41 of enclosure 33 to control the level of the liquid in the boiler member thus formed and to bring it into balance if need be with the levels of other similar members. This connecting tubing between different enclosures is sufficient to insure that the water level will be in equilibrium in a battery of evaporators that can be formed by grouping such enclosures.

Comparison, for example, with a plant of the nature described in French Patent No. 1,204,414, dated March 26, 1958, by the Societe Parisienne de Constructions shows that the common reservoir of the battery of evaporating members may be eliminated, which constitutes a considerable simplification of the plant, since in addition to the common reservoir the following connecting piping between pressure enclosures and reservoirs is also eliminated;

Emulsion bypass piping;
Water recycling piping;
Superheater feed piping, if the superheater is located directly above the evaporator in the same pressure enclosure.

The evaporator thus designed is particularly favorable to natural circulation. The water-steam separation apparatus (cyclones 40) and the dryers (42, 44) are easily situated in the pressure-equalizing enclosure 33 installed in each tower 1. Assembly of such an evaporator is particularly simple, since the internal apparatus can be slipped into the pressure enclosure as a single unit. The piping of water tap 46 may be introduced after the internal apparatus is in place, upset in a hole made to that purpose in the wall of liquid chamber 41, and then attached to enclosure 1 by a fillet weld.

FIGURE 4 shows, as an example, a combination of an evaporation and superheating tower 1 of the type just described with an economizer tower 60 situated below the preceding, it being possible to arrange a row of such towers in the direction at right angles to the figure, and associated with a second row of similar towers 1A-60A, on either side of the median plane of an intake collector 70 for hot fluid and an outlet collector 71 for the same fluid cooled in the battery. Lateral pipes 72-72A connect intake collector 70 to intakes 4-4A of each of the towers 1-1A, and pipes 74-74A collect the cooled fluid at the bottom of economizer towers 60-60A to send it back to outlet collector 71. Hot fluid outlet pipe 25 of tower 1 is connected directly to the top end of economizer tower 60, within which said fluid circulates around a helicoidal bundle 61 formed between a distributor 62 and a collector 63, the liquid to be evaporated, coming from an intake pipe 64, being introduced into the economizer by ducts 65, which pass through the lower end of tower 60 via thermal sleeves 66 and are connected to distributor 62. The liquid, heated by contact with bundle 61, is admitted at the bottom of tower 1 by intake pipes 30, which pass through the upper end of economizer tower via thermal sleeves 67. Helicoidal bundles 61 may with advantage be constructed in a similar manner to evaporation bundle 19-20 of tower 1, in two halves separated by a crossing zone (not shown in detail in this case).

The steam produced and superheated in towers 1-1A is collected by means of steam outlet tubes 51-51A in an outlet collector 52.

FIGURE 5 represents a variant embodiment of a plant of this kind, in which the same reference numbers designate members identical with or equivalent to those previously represented. In this variant towers 100-100A which replaces towers 1-1A of the preceding example, are simple evaporation towers without superheaters. The dry steam collected at the top of these towers leaves via pipes 102, enters superheating towers 104-104A, into which said tubes 102 enter via thermal sleeves 106. In these towers the steam circulates within a superheating nest 108 set up between an intake collector 109 and an outlet collector 110. Steam outlet pipes 112 pass through the upper end of the superheating towers via thermal sleeves 113 and are then connected by connecting tubes 51-51A to steam output pipe 52. The hot fluid passes through superheating towers 104-104A around the outside of the superheating nests and is collected in outlet pipes 114-114A, which enter the evaporation towers via thermal sleeves 115-115A and are finally connected directly to distributor 17 of the corresponding evaporation bundle 19-20.

The invention is of course not limited to the embodiments that have been chosen and represented, which have only been given by way of examples. It may be noted in particular that the arrangement of the exchanger tubes in spirals is only one possibility among others; in particular, the exchangers may have longitudinal circulation. The possibility may also be noted of having the hot fluid circulate within the exchanger tubes from one end to the other of the plant, including the economizers, which may be envisaged to advantage, for example, in the case of very high pressures of the hot fluid.

While in accordance with the provisions of the statutes we have illustrated and described herein the best forms and modes of operation of the invention now known to us, those skilled in the art will understand that changes may be made in the forms of the apparatus disclosed without departing from the spirit of the invention covered by our claims, and that certain features of our invention may sometimes be used to advantage without a corresponding use of other features.

What is claimed is:

1. A vapor generating and superheating unit comprising wall means forming a vertically elongated pressure vessel of circular cross section and adapted to contain a body of vaporizable liquid having a liquid level separating an upper vapor space from a lower liquid space, plate means co-acting with said pressure vessel wall to form an annular vapor-liquid collection chamber above said liquid space, said plate means having a lower portion of reduced diameter forming a tubular downcomer extending co-axially with said pressure vessel to the lower portion of said liquid space and forming an annular vapor generating chamber between said downcomer and said pressure vessel wall, said vapor generating chamber communicating at its upper end with said vapor-liquid collection chamber, a plurality of tubes constituting an annular bundle arranged to substantially fill said annular vapor generating chamber, vapor-liquid separating means arranged to separate a vapor-liquid mixture received from said annular vapor-liquid collection chamber, said separating means arranged to discharged separated liquid to said downcomer and separated vapor to said vapor space, a heating fluid inlet extending coaxially with said pressure vessel through said vapor space to the uppermost portion of said tubular downcomer and communicating with the upper end of said annular tube bundle, means for passing a heating fluid through said heating fluid inlet and said tubes, and means for superheating said separated vapor.

2. A vapor generating and superheating unit comprising wall means forming a vertically elongated pressure vessel of circular cross section and adapted to contain a body of vaporizable liquid having a liquid level separating an upper vapor space from a lower liquid space, plate means co-acting with said pressure vessel wall to form an annular vapor-liquid collection chamber above said liquid space, said plate means having a lower portion of reduced diameter forming a tubular downcomer extending co-axially with said pressure vessel to the lower portion of said liquid space and forming an annular vapor generating chamber between said downcomer and said pressure vessel wall, said vapor generating chamber communicating at its upper end with said vapor-liquid collection chamber, an upper tube header positioned in the upper portion of said liquid space, a lower tube header positioned in the lower portion of said liquid space, a plurality of tubes extending from said upper header to said lower header constituting an annular bundle arranged to substantially fill said annular vapor generating chamber, vapor-liquid separating means arranged to separte a vapor-liquid mixture received from said annular vapor-liquid collection chamber, said separating means arranged to discharge separated liquid to said downcomer and separated vapor to said vapor space, a heating fluid inlet extending co-axially with said pressure vessel through said vapor space to the uppermost portion of said tubular downcomer and communicating with said upper tube header, means for passing a heating fluid through said heating fluid inlet and said tubes, and means in said vapor space for superheating said separated vapor.

3. A vapor generating and superheating unit comprising wall means forming a vertically elongated pressure vessel of circular cross section and adapted to contain a body of vaporizable liquid having a liquid level separating an upper vapor space from a lower liquid space, plate means co-acting with said pressure vessel wall to form an annular vapor-liquid collection chamber above said liquid space, said plate means having a lower portion of reduced diameter forming a tubular downcomer extending co-axially with said pressure vessel to the lower portion of said liquid space and forming an annular vapor generating chamber between said downcomer and said pressure vessel wall, said vapor generating chamber communicating at its upper end with said vapor-liquid collection chamber, an upper tube header positioned in the upper portion of said liquid space, a lower tube header positioned in the lower portion of said liquid space, a plurality of tubes extending from said upper header to said lower header constituting an annular bundle arranged to substantially fill said annular vapor generating chamber, vapor-liquid separating means arranged to separate a vapor-liquid mixture received from said annular vapor-liquid collection chamber, said separating means arranged to discharge separated liquid to said downcomer and separated vapor to said vapor space, a heating fluid inlet extending co-axially with said pressure vessel through said vapor space to the uppermost portion of said tubular downcomer and communicating with said upper tube header, a superheating tube bundle positioned in said vapor space, and means for passing a heating fluid through said heating fluid inlet and said tube bundles.

4. A vapor generating and superheating unit comprising wall means forming a vertically elongated pressure vessel of circular cross section and adapted to contain a body of vaporizable liquid having a liquid level separating an upper vapor space from a lower liquid space, plate means co-acting with said pressure vessel wall to form an annular vapor-liquid collection chamber above said liquid space, said plate means having a lower portion of reduced diameter forming a tubular downcomer extending co-axially with said pressure vessel to the lower portion of said liquid space and forming an annular vapor generating chamber between said downcomer and said pressure vessel wall, said vapor generating chamber communicating at its upper end with said vapor-liquid collection chamber, an upper tube header positioned in the upper portion of said liquid space, a lower tube header positioned in the lower portion of said liquid space, a plurality of tubes extending from said upper header to said lower header constituting an annular bundle arranged to substantially fill said vapor generating chamber, vapor-liquid separating means arranged to separate a vapor-liquid mixture received from said vapor-liquid collection chamber, said separating means arranged to discharge separated liquid to said downcomer and separated vapor to said vapor space, a baffle plate arranged in said vapor space to form an annular flow path between said baffle plate and said pressure vessel wall, a superheating tube bundle positioned in said annular flow space, and means for passing a heating fluid serially through said tube bundles.

5. A vapor generating and superheating unit comprising wall means forming a vertically elongated pressure vessel of circular cross section and adapted to contain a body of vaporizable liquid having a liquid level separating an upper vapor space from a lower liquid space, plate means co-acting with said pressure vessel wall to form an annular vapor-liquid collection chamber above said liquid space, said plate means having a lower portion of reduced diameter forming a tubular downcomer extending co-axially with said pressure vessel to the lower portion of said liquid space and forming an annular vapor generating chamber between said downcomer and said pressure vessel wall, said vapor generating chamber communicating at its upper end with said vapor-liquid collection chamber, an upper tube header positioned in the upper portion of said liquid space, a lower tube header positioned in the lower portion of said liquid space, a plurality of tubes extending from said upper header to said lower header constituting an annular helicoidal bundle arranged to substantially fill said vapor generating chamber, said helicoidal tube bundle having an upper and a lower zone, said upper zone having a direction of coiling opposite that of said lower zone, vapor-liquid separating means arranged to separate a vapor-liquid mixture received from said vapor-liquid collection chamber, said separating means arranged to discharge separated liquid to said downcomer and separated vapor to said vapor space, a baffle plate arranged in said vapor space to form an annular flow path between said baffle plate and said pressure vessel wall, a superheating tube bundle positioned in said annular flow space, and means for passing a heating fluid serially through said tube bundles.

6. A vapor generating and superheating unit comprising wall means forming a vertically elongated pressure vessel of circular cross section and adapted to contain a body of vaporizable liquid having a liquid level separating an upper vapor space from a lower liquid space, plate means co-acting with said pressure vessel wall to form an annular vapor-liquid collection chamber above said liquid space, said plate means having a lower portion of reduced diameter forming a tubular downcomer extending co-axially with said pressure vessel to the lower portion of said liquid space and forming an annular vapor generating chamber between said downcomer and said pressure vessel wall, said vapor generating chamber communicating at its upper end with said vapor liquid collection chamber, an upper tube header positioned in the upper portion of said liquid space, a lower tube header positioned in the lower portion of said liquid space, a plurality of tubes extending from said upper header to said lower header constituting an annular helicoidal bundle arranged to substantially fill said vapor generating chamber, said helicoidal tube bundle having an upper and a lower zone, said upper zone having a direction of coiling opposite that of said lower zone, vapor-liquid separating means arranged to separate a vapor-liquid mixture received from said vapor-liquid collection chamber, said separating means arranged to discharge separated liquid to said downcomer and separated vapor to said vapor space, a baffle plate arranged in said vapor space to form an annular flow space between said baffle plate and said pressure vessel wall, an inlet conduit extending through the upper extremity of said pressure vessel, a tubular conduit extending co-axially with said downcomer from said upper header into the vapor space, a second plurality of tubes extending from said inlet conduit to said tubular conduit in said annular flow space to form a superheating bundle, and means for passing a heating fluid serially through said inlet conduit to said superheating tube bundle to said tubular conduit to said upper header to said helicoidal tube bundle to said lower header to vaporize and superheat said vaporizable liquid.

7. A vapor generating and superheating unit comprising wall means forming a vertically elongated pressure vessel of circular cross section and adapted to contain a body of vaporizable liquid having a liquid level separating an upper vapor space from a lower liquid space, plate means co-acting with said pressure vessel wall to form an annular vapor-liquid collection chamber above said liquid space, said plate means having a lower portion of reduced diameter forming a tubular downcomer extending co-axially with said pressure vessel to the lower portion of said liquid space and forming an annular vapor generating chamber between said downcomer and said pressure vessel wall, said vapor generating chamber communicating at its upper end with said vapor-liquid collection chamber, an upper tube header positioned in the upper portion of said liquid space, a lower tube header positioned in the lower portion of said liquid space, a plurality of tubes extending from said upper header to said lower header constituting an annular bundle arranged to substantially fill said annular vapor generating chamber, vapor-liquid separating means arranged to separate a vapor-liquid mixture received from said annular vapor-liquid collection chamber, said separating means arranged to discharge separated liquid to said downcomer and separated vapor to said vapor space, a heating fluid inlet extending co-axially with said pressure vessel through said vapor space to the uppermost portion of said tubular downcomer and communicating with said upper tube header, means for superheating said separated vapor, and means for passing a heating fluid through said heating fluid inlet and said tube bundle.

8. A vapor generating and superheating unit comprising wall means forming a vertically elongated pressure vessel of circular cross section and adapted to contain a body of vaporizable liquid having a liquid level separating an upper vapor space from a lower liquid space, plate means co-acting with said pressure vessel wall to form an annular vapor-liquid collection chamber above said liquid space, said plate means having a lower portion of reduced diameter forming a tubular downcomer extending co-axially wtih said pressure vessel to the lower portion of said liquid space and forming an annular vapor generating chamber between said downcomer and said pressure vessel wall, said vapor generating chamber communicating at its upper end with said vapor-liquid collection chamber, an upper tube header positioned in the upper portion of said liquid space, a lower tube header positioned in the lower portion of said liquid space, a plurality of tubes extending from said upper header to said lower header constituting an annular helicoidal bundle arranged to substantially fill said annular vapor generating chamber, said helicoidal tube bundle having an upper and a lower zone, said upper zone having a direction of coiling opposite that of said lower zone, vapor-liquid separating means arranged to separate a vapor-liquid mixture received from said annular vapor-liquid collection chamber, said separating means arranged to discharge separated liquid to said downcomer and separated vapor to said vapor space, means for superheating said separated vapor, and means for passing a heating fluid through said tube bundle.

9. A vapor generating and superheating unit as claimed in claim 1 having a second vertically elongated pressure vessel disposed in axial alignment below said first named pressure vessel, an economizer tube bundle disposed in said second pressure vessel, means communicating said second pressure vessel with said annular tube bundle in said first named pressure vessel, and means communicating said economizer tube bundle with the lower portion of said liquid space in said first named vessel.

10. A vapor generator as claimed in claim 9 wherein said vapor superheating means comprises a superheater pressure vessel disposed in axial alignment above said first named pressure vessel, a superheater tube bundle disposed in said superheater pressure vessel, means communicating said superheater pressure vessel with said heating fluid inlet in said first named vessel, means communicating said superheater tube bundle with the upper portion of said vapor space in said first named vessel, and means for passing a heating fluid serially through said superheater pressure vessel to said tube bundle in said first named vessel to said second pressure vessel to vaporize and superheat said vaporizable liquid.

11. A vapor generating and superheating unit as claimed in claim 9 wherein said vapor superheating means comprises a baffle plate arranged in said vapor space to form an annular flow path between said baffle plate and said pressure vessel wall, a superheating tube bundle positioned in said annular flow space, and means for passing a heating fluid serially through said superheating tube bundle to said first named tube bundle.

References Cited in the file of this patent

UNITED STATES PATENTS

| 448,542 | Quiggin | Mar. 17, 1891 |
| 2,625,915 | Glasgow et al. | Jan. 20, 1953 |
| 2,922,404 | Kopp et al. | Jan. 26, 1960 |
| 2,973,749 | Huet | Mar. 7, 1961 |
| 3,071,119 | Ammon et al. | Jan. 1, 1963 |

FOREIGN PATENTS

| 1,197,675 | France | June 8, 1959 |